June 4, 1929.   A. R. MORRILL   1,716,079
INSEAM TRIMMING MACHINE
Original Filed Jan. 20, 1927   3 Sheets-Sheet 3
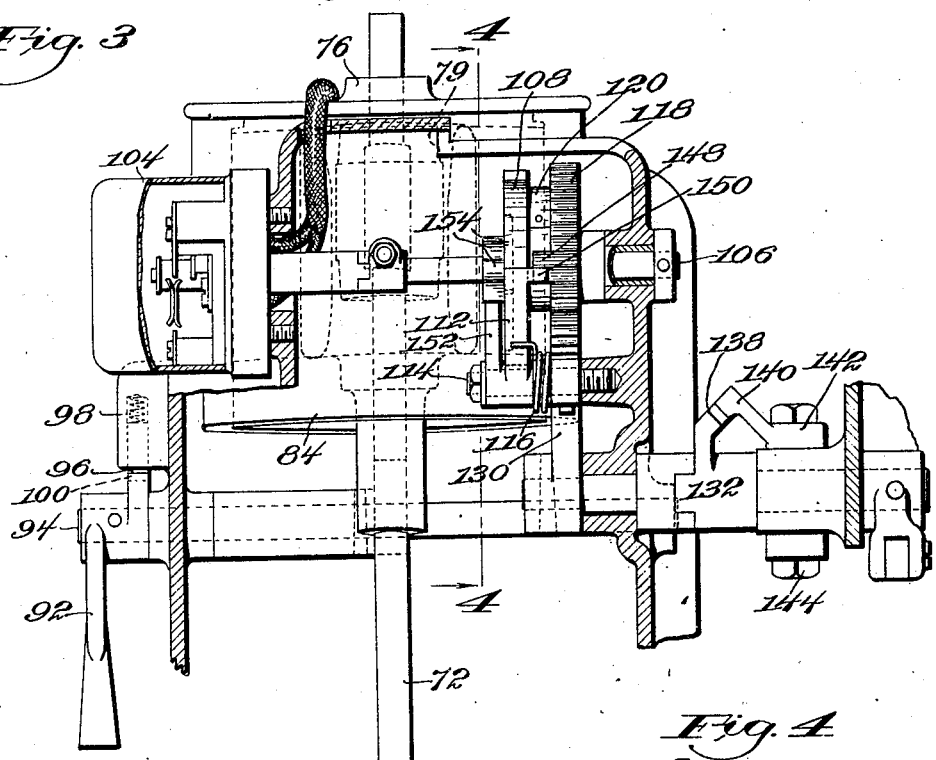
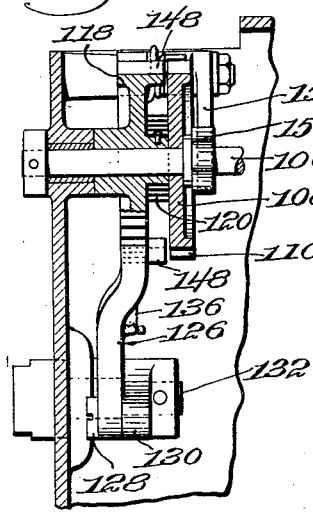
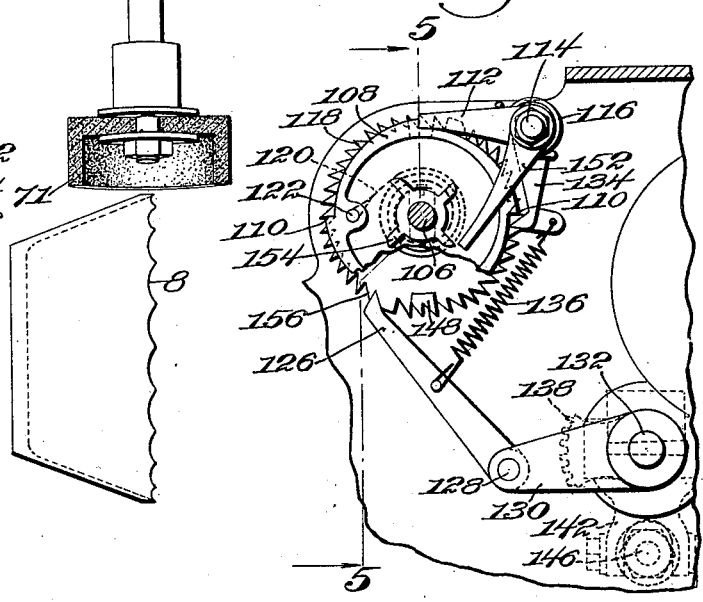
Inventor
Alfred R. Morrill
by Van Everen Fish
Hildreth & Cary Attys
Witness
Jas. J. Maloney Patented June 4, 1929.

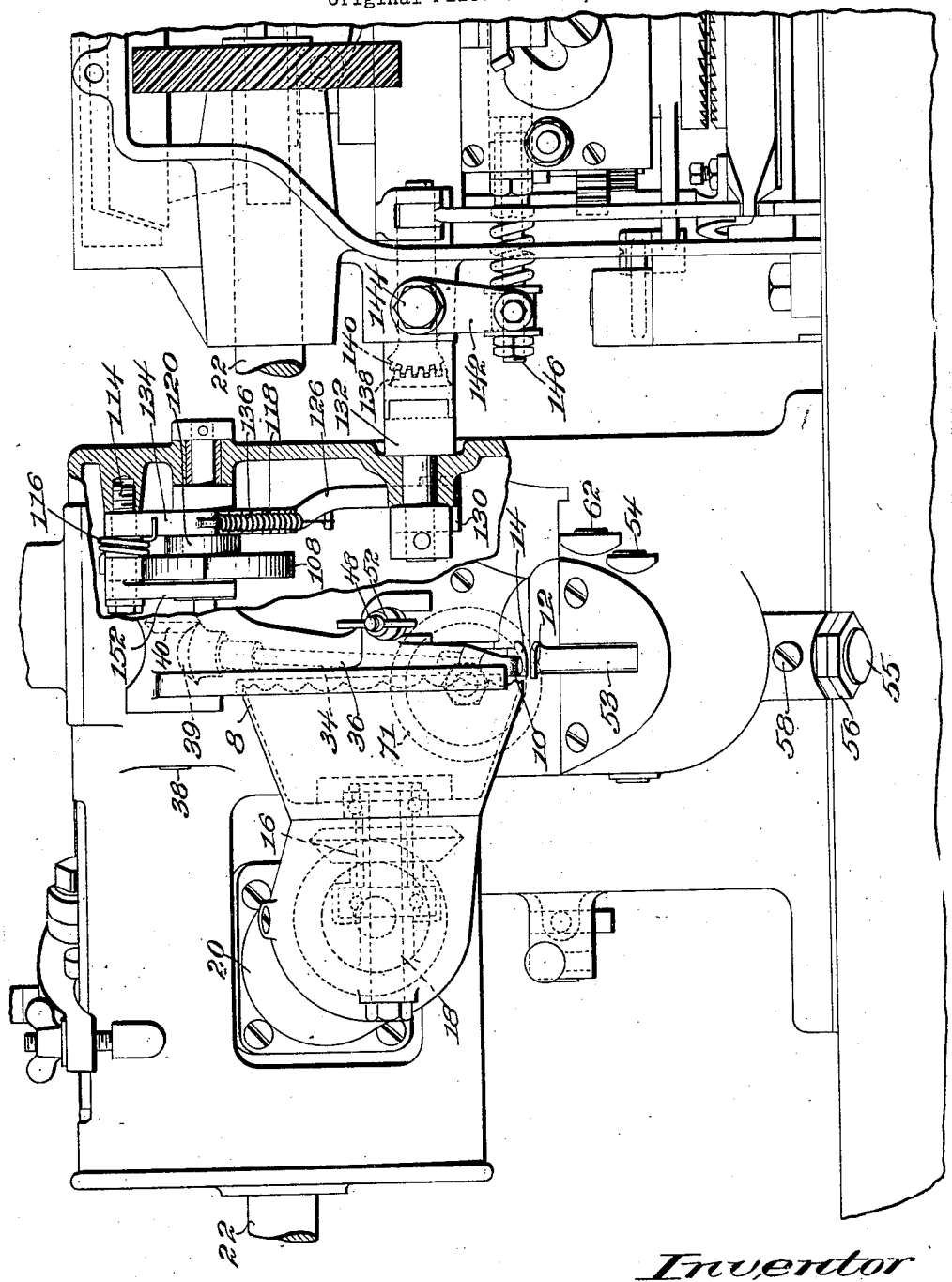

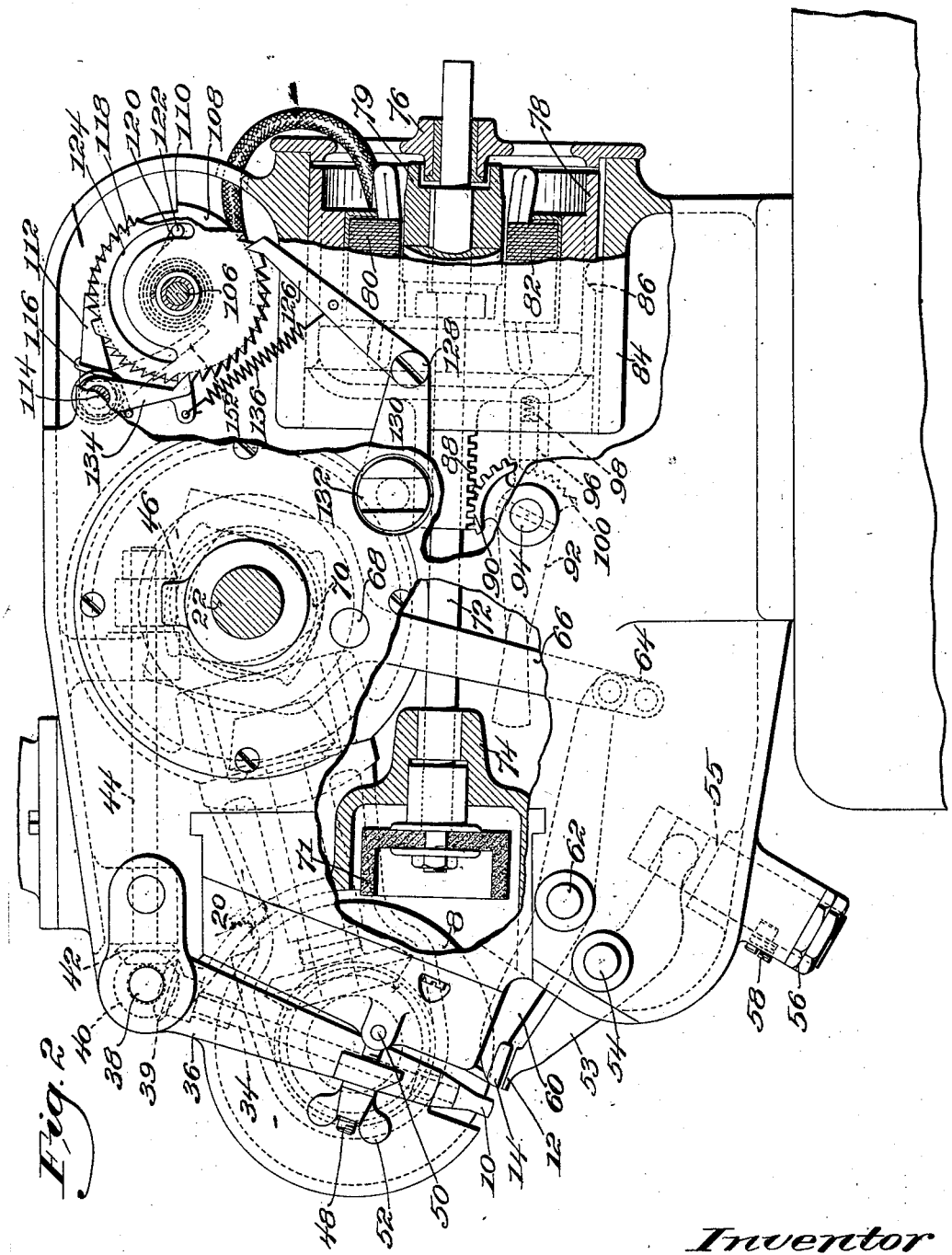

1,716,079

UNITED STATES PATENT OFFICE.

ALFRED R. MORRILL, OF BEVERLY, MASSACHUSETTS, ASSIGNOR TO UNITED SHOE MACHINERY CORPORATION, OF PATERSON, NEW JERSEY, A CORPORATION OF NEW JERSEY.

INSEAM-TRIMMING MACHINE.

Application filed January 20, 1927, Serial No. 162,274. Renewed November 6, 1928.

The invention relates to inseam trimming machines and more particularly to the mechanism used in this class of machines for grinding the trimming knife.

The primary object of the invention is the production of an inseam trimming machine in which the trimming knife is at all times automatically maintained in a sharpened condition.

For the attainment of this object the invention contemplates the provision, in an inseam trimming machine, of a cutter grinding mechanism and means acting automatically to throw the cutter grinding mechanism into and out of operation while a series of shoes are being trimmed by the machine. The embodiment of this feature of the invention hereinafter specifically described comprises a timing mechanism for throwing a grinding tool into and out of operation at the beginning and end of the operation on a selected shoe in a series operated upon by the machine.

Another object of the invention is the production of a novel and improved cutter grinding mechanism especially adapted for use in an inseam trimming machine, but also capable of use in other types of machines.

With this object in view, a feature of the invention contemplates the use of an electric motor arranged not only to drive a grinding tool, but to move the grinding tool into operating position whenever the motor is put into operation. In one embodiment of this feature of the invention hereinafter specifically described the armature of the motor is mounted so as to be capable of movement axially with relation to the magnetic field and is so positioned that it tends to center itself in the field when the current is turned on in starting the motor and through its connection with the grinding tool moves the tool into contact with the cutter of the machine.

Other features of the invention consist in the devices, combinations and arrangement of parts hereinafter described and claimed which together with the advantages gained thereby will be readily understood by those skilled in the art from the following description taken in connection with the accompanying drawings.

Fig. 1 of the drawings is a view in front elevation partly in section of the head and a portion of the driving mechanism of a machine embodying the invention; Fig. 2 is a view in side elevation of the head of the machine partly in section and with portions of the frame broken away to show underlying parts; Fig. 3 is a plan view illustrating particularly the grinding tool and its actuating mechanism; Fig. 4 is a view in left side elevation taken on the line 4—4 of Fig. 3; and Fig. 5 is a view in rear elevation taken on the line 5—5 of Fig. 4.

The machine illustrated in the drawing is constructed and arranged for trimming the inseams of welt shoes and is similar in many respects to the machine disclosed in the inventor's pending application Serial No. 355,583, filed on February 2, 1920. A rotary crown shaped trimming knife is mounted to operate across the line of feed of the shoe which is supported upon a jack and maintained in proper position with relation to the trimming knife by the jack and by suitable guides engaging the shoe. During the trimming operation the shoe is also subjected to the action of a rapid vibratory welt beater. A feeding movement past the trimming knife is imparted to the shoe by mechanism acting on the jack and by means of a roll which is rotated from the main driving shaft of the machine and which also serves as a channel guide.

Referring to the drawings, a trimming knife is indicated at 8, the feeding roll and channel guide is indicated at 10, a crease guide at 12 and a welt beater at 14. The trimming knift 8 is mounted on a sleeve 16 journaled on a shaft 18 secured in an adjustable carriage 20 and is driven from a shaft 22 which constitutes the main shaft of the head of the machine through connections more fully disclosed in the inventor's application above referred to.

The roll 10 is mounted on the lower end of a shaft 34 (see Figs. 1 and 2) journaled in bearings in a hanger 36 which is pivoted on bearing pins 38 to swing about a horizontal axis. The shaft 34 carries at its upper end a gear 39 meshing with a gear 40 mounted on the machine frame and which in turn meshes with a gear 42 fixed to one end of a shaft 44 which is driven through a spiral gear 46 from the main driving shaft 22. The position of the hanger 36 is adjustably determined in accordance with the requirements of the work being operated upon by means of a bolt 48, pivotally mounted at 50 on the machine frame, and a nut 52.

The crease guide 12 which also serves as a bed or table against which the welt beater operates is formed on the front end of a lever 53 pivoted at 54 to the machine frame and adjustably held in position by means of a bolt 55 provided at its upper end with a slot engaging the rear end of the lever. The bolt is held in position by lock nuts 56 at its lower end and is adjusted by a screw 58 provided at its inner end with an excentric pin engaging a cross slot in the bolt.

The vibratory welt beater 14 which has been disclosed in connection with the present machine is similar in general construction and in mode of operation to that shown in the inventor's pending application Serial No. 355,583. The welt of the shoe is beaten out as it is advanced across the upper surface of the guide 12 by the beater 14 formed on the forward end of a lever 60 pivoted on a stud 62. The rear end of the lever 60 is connected by means of a link 64 with the lower end of an actuating lever 66 pivoted at 68 on the frame. The upper end of the lever 66 embraces a three point cam 70 mounted on the main shaft 22.

The grinding mechanism for maintaining the trimming knife in a sharpened condition comprises a rotary grinding disk or wheel 71 mounted so that it may be moved into and out of operative position with relation to the knife. The grinding disk is secured to the forward end of a shaft 72 which is journaled at a slight angle to the horizontal, see Fig. 2, in bearings 74 and 76 in the machine frame and in a sleeve 78 intermediate the bearings 74 and 76. The shaft 72 and the rotary disk 71 are driven independently of the other parts of the machine by means of a small induction motor. The armature of this motor is indicated at 79 and is mounted on the shaft 72 and the field magnets or poles of the motor indicated at 80 and 82, are mounted within a cylindrical field magnet frame integral with the sleeve 78. Normally, when the grinding tool is not in use, the current is shut off from the motor and the shaft 72 is held in retracted position by the action of gravity so that the grinding disk 71 is out of contact with the trimming knife 8, as illustrated in Figs. 2 and 3. In this position of the parts the armature is located to the rear of the central plane of the field magnet poles with the result that when the current is turned on to start the motor the armature tends to center itself in the magnetic field and the grinding disk is advanced yieldingly into engagement with the cutting knife.

In order to permit an easy adjustment of the position of the grinding tool with relation to the knife as the grinding surface wears away the field magnet frame is mounted in a cylindrical guideway 84 to slide lengthwise of the grinding tool shaft 72 but is prevented from turning by means of a key indicated at 86. The field magnet frame is held adjustably in position by the engagement of a rack 88 formed on the frame with a gear segment 90 mounted on a rock shaft 94 journaled in the machine frame and having secured at one end thereof the hand lever 92. The hand lever 92 is held in the position to which it is turned by the operator in correcting the adjustment of the grinding tool by the engagement of a spring pressed plunger 96 mounted in a recess 98 in the machine frame with one of a series of notches 100 formed on the hub of the hand lever 92.

In the illustrated machine the grinding mechanism is automatically thrown into operation to sharpen the trimming knife during the operation on every eleventh shoe in order that the knife may at all times be maintained in a sharpened condition with little or no attention from the operator. This is accomplished by means of an electric switch in the circuit of the motor which drives the grinding disk, and a timing mechanism therefor which is operated from the starting and stopping mechanism of the machine. A switch of ordinary design is indicated at 104, its movable contacts being mounted on the end of a shaft 106 journaled in the machine frame. Also secured to the shaft is a disk 108 which is provided with four notches 110 spaced at equal intervals around the periphery of the disk. The disk 108 and shaft 106 are held in one of four positions determined by the position of the notches 110, corresponding to two open and two closed positions of the switch 104, by means of a latch lever 112 mounted on a pivot 114 on the frame and held in engagement with the periphery of the disk 108 by a spring 116. A ratchet wheel 118 is loosely mounted on the shaft 106 and connected to the disk 108 through a spring 120 which is loosely coiled about the shaft, and is fastened at one end to a pin 122 on the disk 108 and at the other end to the ratchet wheel 118. The relative movements of the disk 108 and the ratchet wheel 118 are limited by the engagement of the pin 122 in a semi-circular slot 124 in the ratchet wheel.

The ratchet wheel is given a step by step advancing movement through connections from the starting and stopping mechanism of the machine, a portion of which is disclosed in Fig. 1. For a complete disclosure and detailed description of this portion of the machine reference may be had to the inventor's above mentioned pending application Serial No. 355,583. The connections for actuating the ratchet wheel comprise a pawl 126 mounted at 128 on a lever arm 130 which is fixed to a rock shaft 132 and a stop pawl 134 mounted on the pivot 114. A spring 136 stretched between the pawls tends to hold them in engagement with the ratchet wheel. The rock shaft 132 is provided with a gear segment 138 which is adapted to mesh with a gear segment 140 formed on one arm of a lever 142 pivotally mounted at 144 on the machine frame. At its lower end the lever 142 has a connection with the lock bolt carrier 146 of the starting and stopping mechanism of the machine.

When the machine is started the lock bolt carrier 146 is moved some distance to the left as viewed in Fig. 1 causing the ratchet wheel to be advanced one tooth. Again when the machine is brought to a stop the lock bolt carrier 146 is moved some distance to the right and then part way back again towards its original position, these movements of the lock bolt carrier upon stopping the machine causing the pawl 126 first to retract over two teeth and then to advance the ratchet wheel one tooth.

At two points diametrically opposite each other on the periphery of the ratchet wheel two consecutive teeth are extended sideways on a lug as indicated at 148 to engage with a corresponding lug 150 formed on the latch lever 12. As the first of these teeth comes into contact with the lug 150 the lever will be momentarily raised to allow the disk 108 to rotate under the influence of its spring 120 through a quarter-turn to close the switch. When the machine stops as the ratchet wheel is again advanced the second tooth will pass under the lug 150 tripping the latch lever 112 a second time and permitting the disk 108 to turn through another quarter turn to open the switch.

In order to insure that the latch lever 112 acting under the influence of its spring 116 shall swing back into contact with the periphery of the disk 108 in time to engage the next succeeding notch a lever arm 152 is formed on the hub of the latch lever 112 and is positioned to engage with short arms 154 mounted on the hub of the disk 108. These arms 154 force the latch lever 112 inwardly into engagement with the notches on the disk 108.

As a safeguard to make certain that the ratchet wheel is timed to close the switch only when the machine is started and to open it when the operation is completed the portion of the periphery of the wheel immediately succeeding the tooth indicated at 156 which must be in engagement with the pawl when the switch is closed, is left plain or untoothed. With this construction, as the machine is stopped just prior to throwing the grinding tool into operation, as illustrated in Figs. 2, 3, 4 and 5, the pawl 126, in retracting to get a new purchase, must necessarily engage the tooth 156 and bring it into proper position, since, if the ratchet wheel is out of time with the starting and stopping mechanism of the machine, that is, one step too far advanced, the pawl 126, in its retracting and advancing movements will come into contact with the untoothed surface and will slide over it and then back into engagement with the tooth 156 without moving the ratchet wheel.

The operation of the machine with particular reference to the mechanism for actuating the grinding tool is as follows: Each time the machine is stopped after operating on a shoe and each time it is started to operate on a new shoe the ratchet wheel is advanced one tooth until at the end of one half revolution of the ratchet wheel the spring for rotating the switch is fully wound and the parts of the timing mechanism have taken the position illustrated in Figs. 2–5. The machine is here shown in stopped position just prior to throwing the grinding tool into operation. When the machine is again started the pawl 126 causes the ratchet wheel to advance one tooth thereby raising the latch lever 112 as above described and permitting the switch shaft and disk 108 to rotate through one quarter of a revolution to close the motor switch. As the current is built up in the motor the armature tends to center itself in the magnetic field so that the grinding surface is moved forward into yielding contact with the trimming knife. The grinding disk remains in contact with the trimming knife during the trimming of a shoe. When the machine is stopped the latch lever 112 is again lifted permitting the shaft 106 and disk 108 to turn through another quarter revolution to turn off the switch and allow the grinding disk to move backwards into its original idle position.

The nature and scope of the invention having been indicated and an embodiment of the invention in an inseam trimming machine having been specifically described, what is claimed is:

1. A machine for operating upon shoes having, in combination, an inseam trimming knife, a grinding tool for grinding the knife, and electrically controlled means for moving the grinding tool into and out of operation.

2. A machine for operating upon shoes having, in combination, an inseam trimming knife, a grinding tool for grinding the knife, mechanism for starting and stopping the machine, and means actuated by said mechanism for throwing the grinding tool into and out of operation at intervals in the operation of the machine on a series of shoes.

3. A machine for operating upon shoes having, in combination, an inseam trimming knife, a grinding tool for grinding the knife, operating means for the grinding tool, and timing mechanism for throwing the operating means into operation to grind the knife during the operation on one of a series of shoes operated upon by the machine.

4. A machine for operating upon shoes having, in combination, an inseam trimming knife, a rotary grinding tool for grinding the knife, electrical operating means for driving the grinding tool and for moving the tool into operating position, and timing mechanism for throwing the operating means into operation to grind the knife during the operation on one of a series of shoes operated upon by the machine comprising a ratchet wheel, connections from the starting and stopping mechanism of the machine for advancing the ratchet wheel step by step, and an electric switch controlled by the ratchet wheel for throwing the electrical operating means into and out of operation.

5. A machine for operating upon shoes having, in combination, an inseam trimming knife, a rotary grinding tool for grinding the knife, and an electric motor for driving the grinding tool having its armature movable relatively to the field to bring the tool into and out of active operation.

6. A grinding mechanism for grinding knife edge machine parts having, in combination, a rotary grinding surface, and an electric motor connected thereto, the armature of which is movable relatively to the magnetic field to move the grinding surface into and out of operating position.

7. A grinding mechanism for sharpening knife edge machine parts having, in combination, a rotary grinding surface, and an electric motor connected to drive said surface, the armature of said motor being movable with relation to the magnetic field and so positioned that the armature tends to center itself in the field on starting the motor and brings the grinding surface into operating position.

8. A grinding mechanism for sharpening knife edge machine parts having, in combination, a rotary grinding surface, an electric motor, and a rotatable and axially movable shaft on which are mounted the grinding surface and the armature of the motor, the parts being so arranged that the tendency of the armature to center itself in its magnetic field holds the grinding surface yieldingly in operating position while the motor is running.

9. A machine for operating upon shoes having, in combination, an inseam trimming knife, grinding mechanism for grinding the knife, and means for throwing the grinding mechanism automatically into and out of operation to grind the knife during the operation on one of a series of shoes operated upon by the machine.

10. A machine for operating upon shoes having, in combination, an inseam trimming knife, grinding mechanism for grinding the knife, and means rendered active in starting and stopping the machine for automatically throwing the grinding mechanism into and out of operation to grind the knife during the operation on one of a series of shoes operated upon by the machine.

11. A machine for operating upon shoes having, in combination, an inseam trimming knife, grinding mechanism for grinding the knife, and timing mechanism actuated in stopping and starting the machine for causing the grinding mechanism automatically to grind the knife during the operation on selected shoes of a series operated upon by the machine.

12. A machine for operating upon shoes having, in combination, an inseam trimming knife, grinding mechanism for grinding the knife including an electric motor, and means for controlling the operation of the motor to grind the knife during the operation on one of a series of shoes operated upon by the machine.

13. A machine for operating upon shoes having, in combination, an inseam trimming knife, a grinding tool for grinding the knife, and timing mechanism actuated during the operation on each shoe and acting to throw the grinding tool into operation at intervals during the operation on a series of shoes.

14. A machine for operating upon shoes having, in combination, an inseam trimming knife, a grinding tool for grinding the knife, and timing mechanism actuated each time a shoe is operated upon and acting after being actuated a predetermined number of times to throw the grinding tool into operation.

15. A machine for operating upon shoes having, in combination, an inseam trimming knife, a grinding tool for grinding the knife, an electric motor and suitable connections for actuating the grinding tool, a switch for controlling the operation of the motor, and means operated each time a shoe is operated upon for actuating the switch to put the motor into and out of operation at intervals during the operation of the machine on a series of shoes.

In testimony whereof I have signed my name to this specification.

ALFRED R. MORRILL.